United States Patent
Kanetani et al.

(10) Patent No.: US 10,514,294 B2
(45) Date of Patent: Dec. 24, 2019

(54) OPTICAL MEASUREMENT APPARATUS HAVING A SYNCHRONIZING FUNCTION OF SYNCHRONIZING TIME BETWEEN A MASTER DEVICE AND A SLAVE DEVICE, AND CONNECTABLE TO AN INDUSTRIAL NETWORK

(71) Applicant: OMRON Corporation, Kyoto-shi, Kyoto (JP)

(72) Inventors: Yoshihiro Kanetani, Fukuchiyama (JP); Tomonori Kondo, Fukuchiyama (JP); Yuta Suzuki, Ayabe (JP)

(73) Assignee: OMRON Corporation, Kyoto-shi (JP)

( * ) Notice: Subject to any disclaimer, the term of this patent is extended or adjusted under 35 U.S.C. 154(b) by 175 days.

(21) Appl. No.: 15/636,215

(22) Filed: Jun. 28, 2017

(65) Prior Publication Data
US 2018/0010962 A1  Jan. 11, 2018

(30) Foreign Application Priority Data
Jul. 8, 2016 (JP) .................. 2016-135957

(51) Int. Cl.
*G01J 1/42* (2006.01)
*G01B 21/04* (2006.01)
(Continued)

(52) U.S. Cl.
CPC .......... *G01J 1/4228* (2013.01); *G01B 11/005* (2013.01); *G01B 11/0608* (2013.01);
(Continued)

(58) Field of Classification Search
CPC ................. G01J 1/4228; G05B 19/054; G05B 2219/37117; G05B 19/0423;
(Continued)

(56) References Cited

U.S. PATENT DOCUMENTS 4,982,185 A * 1/1991 Holmberg ............. H04L 12/423
340/3.21
2002/0185998 A1 12/2002 Beck
(Continued)

FOREIGN PATENT DOCUMENTS

CN 102183940 A 9/2011
CN 103186248 A 7/2013
(Continued)

OTHER PUBLICATIONS

The Korean Office Action dated Sep. 21, 2018 in a counterpart Korean Patent application.
(Continued)

*Primary Examiner* — Que Tan Le
*Assistant Examiner* — Jennifer D Bennett
(74) *Attorney, Agent, or Firm* — Metrolex IP Law Group, PLLC

(57) ABSTRACT

The optical measurement apparatus includes an interface unit and a measuring unit. The interface unit is configured to receive a synchronization signal transmitted from a PLC to a fieldbus at a constant communication cycle, and output, in synchronization with the synchronization signal, a result of measurement (a measured value) by the optical measurement apparatus and a synchronization supervisory signal. The measuring unit is configured to execute optical measurement at a measurement cycle irrelevant to the communication cycle and generate a result of the measurement and a synchronization supervisory signal. The measuring unit sets the synchronization supervisory signal into an ON state in synchronization with receipt of the synchronization signal by the interface unit after start of the measurement, and sets the synchronization supervisory signal into an OFF state in synchronization with receipt of the synchronization signal by the interface unit when the interface unit outputs the measurement result.

6 Claims, 15 Drawing Sheets

(51) Int. Cl.
  *G01B 11/00* (2006.01)
  *G01B 11/06* (2006.01)
  *G01B 11/24* (2006.01)
  *G05B 19/05* (2006.01)

(52) U.S. Cl.
  CPC ............ *G01B 11/24* (2013.01); *G01B 21/045* (2013.01); *G05B 19/054* (2013.01); *G05B 2219/37117* (2013.01)

(58) Field of Classification Search
  CPC .......... G05B 2219/13063; G05B 19/05; G05B 19/0428; B25J 19/021; B25J 13/08; G01B 11/24; G01B 11/005; G01B 21/045; G01B 11/0608; G01B 11/06; G01B 11/00; G01B 21/04; G01B 11/026; G01B 11/14; G01B 11/25
  See application file for complete search history.

(56) References Cited

U.S. PATENT DOCUMENTS

| | | |
|---|---|---|
| 2004/0167745 A1 | 8/2004 | Suzuki |
| 2007/0288674 A1 | 12/2007 | Ikeno |
| 2008/0088856 A1* | 4/2008 | Nishio ................. G01B 11/026 356/623 |
| 2011/0082586 A1 | 4/2011 | Nishihara |
| 2012/0188350 A1* | 7/2012 | Hammond ............. H04N 5/222 348/61 |
| 2013/0090745 A1* | 4/2013 | Frazer .................... G05B 15/02 700/12 |
| 2013/0254584 A1 | 9/2013 | Tamaoki |

FOREIGN PATENT DOCUMENTS

| | | |
|---|---|---|
| CN | 103988046 A | 8/2014 |
| CN | 204046621 U | 12/2014 |
| CN | 108964865 A | 12/2018 |
| EP | 2653414 A1 | 10/2013 |
| JP | 2004-260380 A | 9/2004 |
| JP | 2007-312043 A | 11/2007 |
| KR | 10-2013-0103589 A | 9/2013 |

OTHER PUBLICATIONS

The extended European search report (EESR) dated Oct. 17, 2017 in a counterpart European patent application.
The Chinese Office action dated Mar. 14, 2019 in a counterpart Chinese patent application.

* cited by examiner

Before correction

After correction

OPTICAL MEASUREMENT APPARATUS HAVING A SYNCHRONIZING FUNCTION OF SYNCHRONIZING TIME BETWEEN A MASTER DEVICE AND A SLAVE DEVICE, AND CONNECTABLE TO AN INDUSTRIAL NETWORK

CROSS-REFERENCE TO RELATED APPLICATION

This application is based on Japanese Patent Application No. 2016-135957 filed with the Japan Patent Office on Jul. 8, 2016, the entire contents of which are incorporated herein by reference.

FIELD

The present invention relates to an optical measurement apparatus, and particularly relates to an optical measurement apparatus configured to be connectable with an industrial network.

BACKGROUND

Machines and facilities used at many production sites are typically controlled by a control system including a control device configured by a programmable logic controller (hereinafter, also abbreviated as a "PLC") or the like.

The PLC and a single or a plurality of remote 10 terminals sometimes communicate, with the PLC functioning as a master device configured to control the entire communication, in accordance with the polling method. For example, JP 2007-312043 A (Patent Literature 1) discloses two typical types of a communication method, namely, the broadcast method and the polling method, for communication between a master device and a slave device in a remote 10 system.

A recent industrial automation site typically has a network (also called a fieldbus) built up for transmission of control commands and data signals. Examples of such a network include the EtherCAT (registered trademark). The EtherCAT is a fieldbus featuring synchrony and configured to achieve synchronization among all slave devices with jitter of 1 μs or less. Each of the slave devices receives an output signal (control signal) from a master device at such synchronization timing and causes an externally acquired value to be reflected to an input signal (a measured value, a status signal, or the like) transmitted to the master device.

Meanwhile, there is an optical measurement apparatus configured to execute continuous measurement with internal synchronization. The EtherCAT connected with such an optical measurement apparatus has an issue of synchronization among devices connected to the EtherCAT. Achievement of highly accurate measurement depends on when to acquire data reflected to a signal transmitted from each of the devices to a PLC.

However, the optical measurement apparatus typically needs to receive light for a certain period of time to acquire a measured value. A measurement period thus includes a light receiving period. There is further needed a period for generation of a measured value from light receipt data in the optical measurement apparatus. The optical measurement apparatus thus occasionally has measurement timing not in synchronization with measurement result output timing. It is thus difficult for a master device to determine measurement timing of a result reflected to data outputted from the optical measurement apparatus.

SUMMARY

It is an object of the present invention to provide an optical measurement apparatus configured to execute measurement with measurement start timing determined from measurement result output timing.

An optical measurement apparatus according to an aspect of the present invention has a synchronizing function of synchronizing time between a master device and a slave device, and is connectable to an industrial network. The optical measurement apparatus includes: an interface unit configured to receive a synchronization signal transmitted from the master device to the industrial network at a constant communication cycle, and output, in synchronization with the synchronization signal, a result of measurement by the optical measurement apparatus and a synchronization supervisory signal having a first state and a second state; and a measuring unit configured to execute at least one optical measurement process at a measurement cycle irrelevant to the communication cycle and generate the measurement result and the synchronization supervisory signal. The measuring unit sets the synchronization supervisory signal into the first state in synchronization with receipt of the synchronization signal by the interface unit after start of the measurement, and sets the synchronization supervisory signal into the second state in synchronization with receipt of the synchronization signal by the interface unit when the interface unit outputs the measurement result.

This configuration achieves provision of the optical measurement apparatus configured to execute measurement with measurement start timing determined from measurement result output timing. Timing of setting (switching) the synchronization supervisory signal into the first state and timing of setting (switching) the synchronization supervisory signal into the second state are in synchronization with receipt of the synchronization signal by the interface unit. The state of the synchronization supervisory signal changes in synchronization with the communication cycle also in a case where the optical measurement cycle is different from the communication cycle. For example, the master device receives the measured value from the optical measurement apparatus as well as the synchronization supervisory signal in the communication cycle. The master device is configured to detect measurement start timing and result output timing of the measurement in accordance with the communication cycle.

The measuring unit preferably sets the synchronization supervisory signal into the first state in synchronization with timing of receipt of the synchronization signal by the interface unit.

The measuring unit according to this configuration sets the synchronization supervisory signal into the first state such that the synchronization supervisory signal indicates start of corresponding measurement. The master device or the like can thus more precisely detect start timing of the measurement by the optical measurement apparatus. The timing of setting the synchronization supervisory signal into the first state has only to be in synchronization with the timing of receiving the synchronization signal by the interface unit. For example, measurement may start and the synchronization supervisory signal may be set into the first state in synchronization with the timing of receiving the synchronization signal by the interface unit. Alternatively, the synchronization supervisory signal may be set into the first state in synchronization with the timing of receiving the synchronization signal by the interface unit subsequent to the measurement start.

The measuring unit preferably sets the synchronization supervisory signal into the second state at timing of outputting the measurement result by the interface unit in synchronization with the synchronization signal.

The measuring unit according to this configuration sets the synchronization supervisory signal into the second state to allow the measurement start timing to be associated with the measurement result acquired at the measurement start timing.

Preferably, the measuring unit is configured to parallelly execute a plurality of measurement processes different from each other in start timing, and the measuring unit sets the synchronization supervisory signal into the first state or the second state to cause change in state of the synchronization supervisory signal when the plurality of measurement processes cause timing of setting the synchronization supervisory signal into the first state matching timing of setting the synchronization supervisory signal into the second state.

This configuration allows the synchronization supervisory signal to be kept in the first state even if subsequent measurement starts during certain measurement. In other words, the state of the synchronization supervisory signal is not influenced by later measurement start. The master device or the like can thus precisely find former measurement start timing. In another state where timing of outputting a result of certain measurement matches start timing of different measurement, the measuring unit can switch the synchronization supervisory signal from the second state into the first state or switch the synchronization supervisory signal from the first state into the second state at the timing. In the first case where the synchronization supervisory signal is switched from the first state into the second state, timing of outputting a measurement result can be associated with timing of starting measurement for acquisition of the measurement result. In the second case where the synchronization supervisory signal is switched from the second state into the first state, timing of starting different measurement can be indicated.

Preferably, the measuring unit is configured to parallelly execute a plurality of measurement processes different from each other in start timing, and generate the synchronization supervisory signal corresponding to each of the plurality of measurement processes, and the measuring unit sets a first synchronization supervisory signal corresponding to a first measurement process in the plurality of measurement processes, out of the plurality of synchronization supervisory signals, into the first state in accordance with start of the first measurement process, starts a second measurement process subsequent to the first measurement process before setting the first synchronization supervisory signal into the second state, and sets a second synchronization supervisory signal corresponding to the second measurement process, out of the plurality of synchronization supervisory signals, into the first state.

Each of the synchronization supervisory signals respectively corresponding to the measurement processes is set into the first or second state in this configuration. The master device can thus precisely find the start timing of each of the plurality of measurement processes by the optical measurement apparatus.

In the optical measurement apparatus according to any one of the above aspects, the communication cycle is shorter than the measurement cycle, or is longer than the measurement cycle and shorter than a period obtained by adding a processing period of measurement by the measuring unit to the measurement cycle.

This configuration improves an effect of association between the timing of outputting a measurement result and the timing of starting measurement for acquisition of the measurement result. When the communication cycle is longer than the period obtained by adding the processing period of the measurement by the measuring unit to the measurement cycle, the measurement can end during a single communication cycle. In an exemplary case where measurement starts during a certain communication cycle and a result of the measurement is outputted in a subsequent communication cycle, start timing of the measurement can easily be associated with timing of outputting a result of the measurement. However, in another case where the communication cycle is shorter than the measurement cycle and the master device receives a measurement result in a certain communication cycle, it is more difficult to specify a time point of measurement executed for acquisition of the measurement result. Also in still another case where the communication cycle is longer than the measurement cycle and is shorter than the period obtained by adding the processing period of the measurement by the measuring unit to the measurement cycle, when the master device receives a measurement result in a certain communication cycle, it can be difficult to specify a time point of measurement executed for acquisition of the measurement result. Monitoring the state of the synchronization supervisory signal in these cases enables association between the timing of outputting a measurement result and the timing of starting measurement for acquisition of the measurement result.

The present invention achieves provision of the optical measurement apparatus configured to execute measurement with measurement start timing determined from measurement result output timing.

DETAILED DESCRIPTION

Figure 1:
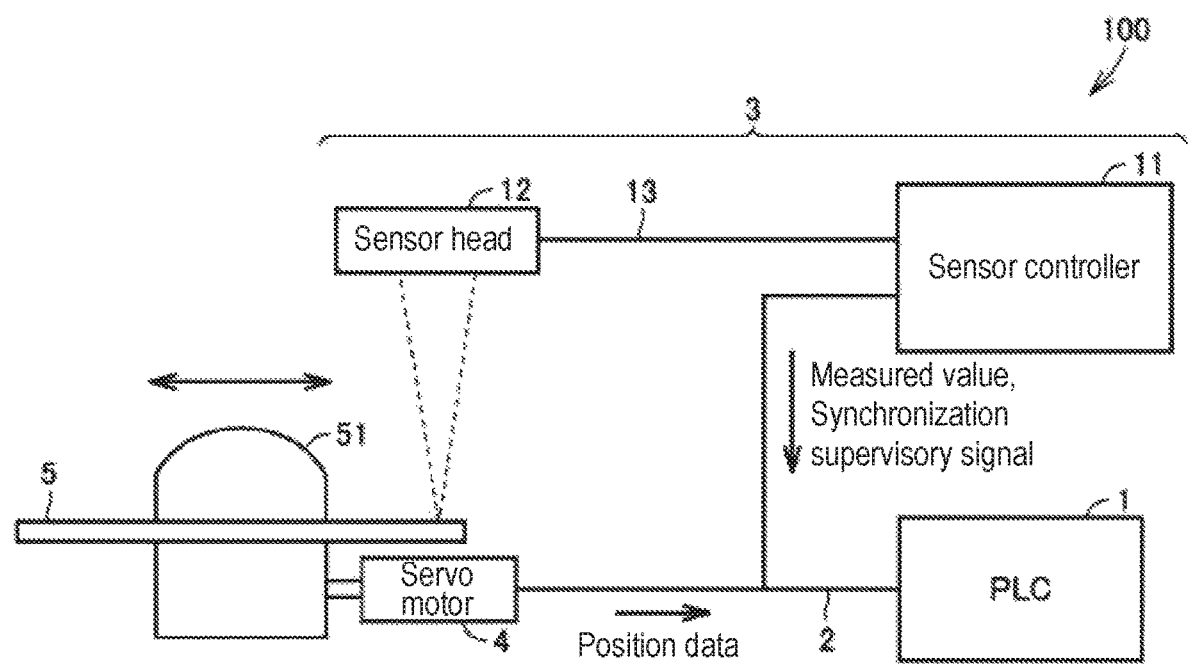
FIG. 1 is a schematic diagram depicting an exemplary configuration of a measurement system according to an embodiment of the present invention.

An embodiment of the present invention will now be described in detail with reference to the drawings. Identical or corresponding portions in the drawings are denoted by an identical reference sign and will not be described repeatedly.

A. Exemplary configuration of control system

FIG. 1 is a schematic diagram depicting an exemplary configuration of a measurement system 100 according to the embodiment. With reference to FIG. 1, the measurement system 100 includes a PLC 1, a fieldbus 2, an optical measurement apparatus 3, and a servo motor 4.

The PLC 1, the optical measurement apparatus 3, and the servo motor 4 are connected to the fieldbus 2. The fieldbus 2 transmits various types of data exchanged with the PLC 1. Typical examples of the fieldbus 2 include various types of the industrial Ethernet (registered trademark). Examples of the industrial Ethernet include the EtherCAT and the PROFINET (registered trademark). The EtherCAT will exemplarily be described below as the fieldbus 2.

The servo motor 4 shifts a stage 5. The servo motor 4 includes an encoder (not depicted). The encoder has a value corresponding to position data indicating a position of the stage 5. The position data is transmitted to the PLC 1 via the fieldbus 2.

The optical measurement apparatus 3 measures displacement of a measurement target 51 placed on the stage 5. The optical measurement apparatus 3 includes a sensor controller 11, a sensor head 12, and a cable 13. The sensor head 12 is connected to the sensor controller 11 by the cable 13.

The sensor controller 11 transmits a control signal to the sensor head 12 via the cable 13. As to be described later, the sensor head 12 includes a light projecting unit and a light receiving unit. The light projecting unit irradiates the stage 5 with light whereas the light receiving unit receives light reflected at the stage 5. The light receiving unit outputs a signal to be transmitted to the sensor controller 11 via the cable 13. The sensor controller 11 calculates a measured value in accordance with the signal from the sensor head 12. The sensor controller 11 transmits the measured value to the PLC 1 via the fieldbus 2. The sensor controller 11 further outputs a synchronization supervisory signal indicating start timing of measurement and timing of outputting a result of the measurement (the measured value). The PLC 1 can thus find, from the synchronization supervisory signal, the start timing of the measurement for acquisition of the measured value. The sensor head 12 according to this embodiment is provided with the light projecting unit and the light receiving unit. The light projecting unit and the light receiving unit can alternatively be provided at the sensor controller 11.

The servo motor 4 shifts the stage 5 to allow the optical measurement apparatus 3 to scan a surface of the measurement target 51. The optical measurement apparatus 3 can thus measure displacement from the sensor head 12 to the surface of the measurement target 51 along the shift of the stage 5. The optical measurement apparatus 3 thus achieves measurement of a surface shape of the measurement target 51 along the shift of the stage 5. FIG. 1 depicts the stage 5 shifting one dimensionally. The stage 5 may alternatively shift two dimensionally (in X and Y directions) (see FIG. 14).

This embodiment secures synchrony between the position data (the value of the encoder) transmitted from the servo motor 4 to the PLC 1 and the measured value transmitted from the optical measurement apparatus 3 to the PLC 1. The position data and the measured value (displacement information) can thus precisely be associated with each other to enable acquisition of more accurate information on the surface shape of the measurement target 51.

B. Fieldbus

Figure 2:
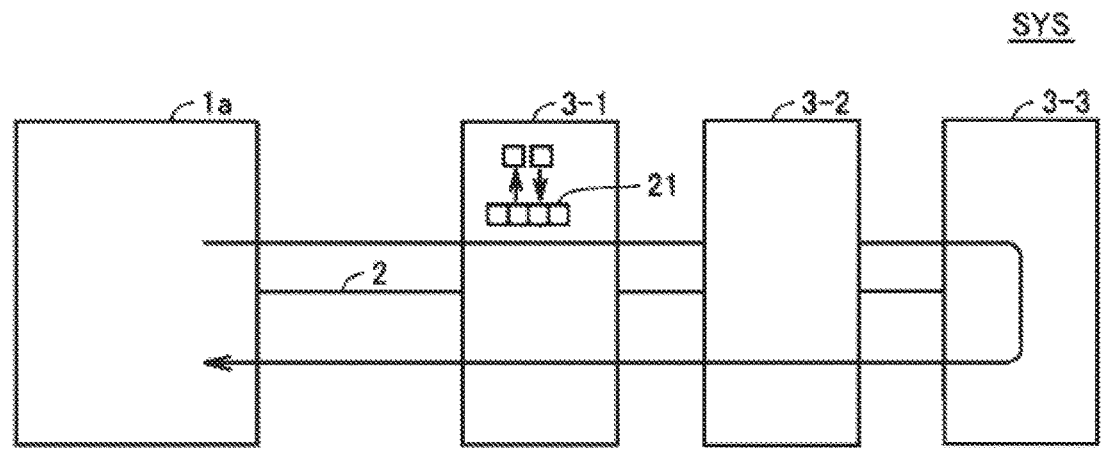
FIG. 2 is a schematic block diagram explanatorily depicting slave synchronization according to the EtherCAT.

FIG. 2 is a schematic block diagram explanatorily depicting slave synchronization according to the EtherCAT. FIG. 2 depicts a control system SYS including a master device 1a, slave devices 3-1 to 3-3, and the fieldbus 2 connecting the master device 1a and the slave devices 3-1 to 3-3.

The master device 1a controls the slave devices 3-1 to 3-3. Each of the slave devices 3-1 to 3-3 transmits frames of the IEEE 802.3 standard Ethernet (registered trademark) at high speed. As depicted in FIG. 2, the master device 1a transmits a frame 21 that passes through the slave devices 3-1, 3-2, and 3-3 in the mentioned order. The frame 21 turns back at the slave device 3-3 to return to the master device 1a. The frame 21 can include a control command and data.

The EtherCAT has one cycle starting when the master device 1a outputs the frame 21 and ending when the frame 21 returns to the master device 1a. Each of the slave devices executes input and output processes on the fly when the frame 21 passes therethrough. All the input and output processes are thus completed during one cycle.

Figure 3:
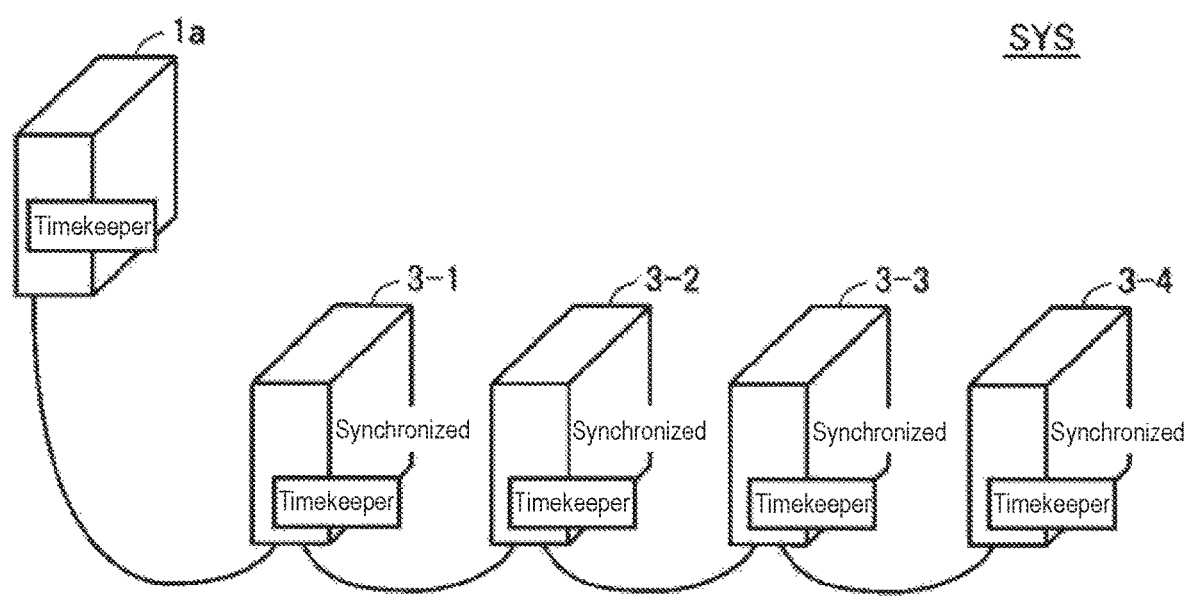
FIG. 3 is a schematic diagram explanatorily depicting a time synchronization function in the EtherCAT.

FIG. 3 is a schematic diagram explanatorily depicting a time synchronization function in the EtherCAT. FIG. 3 depicts the master device 1a, the slave devices 3-1 to 3-3, and a slave device 3-4 each including a timekeeper. The timekeeper provides reference for determination of execution timing of processes by the devices. More specifically, each of the master device 1a and the slave devices 3-1 to 3-4 includes a timer embodied as the timekeeper and configured to periodically generate time information as reference for synchronization. The timekeeper of the master device 1a provides reference time, and the timekeepers of the slave devices 3-1 to 3-4 are made in synchronization with the timekeeper of the master device 1a. More specifically, each of the slave devices 3-1 to 3-4 corrects time deviation of the timer every time such time deviation occurs, in accordance with the frame (see FIG. 2) periodically transmitted on the fieldbus 2. All the slave devices can thus have jitter shift suppressed to 1 μs or less.

Figure 4:
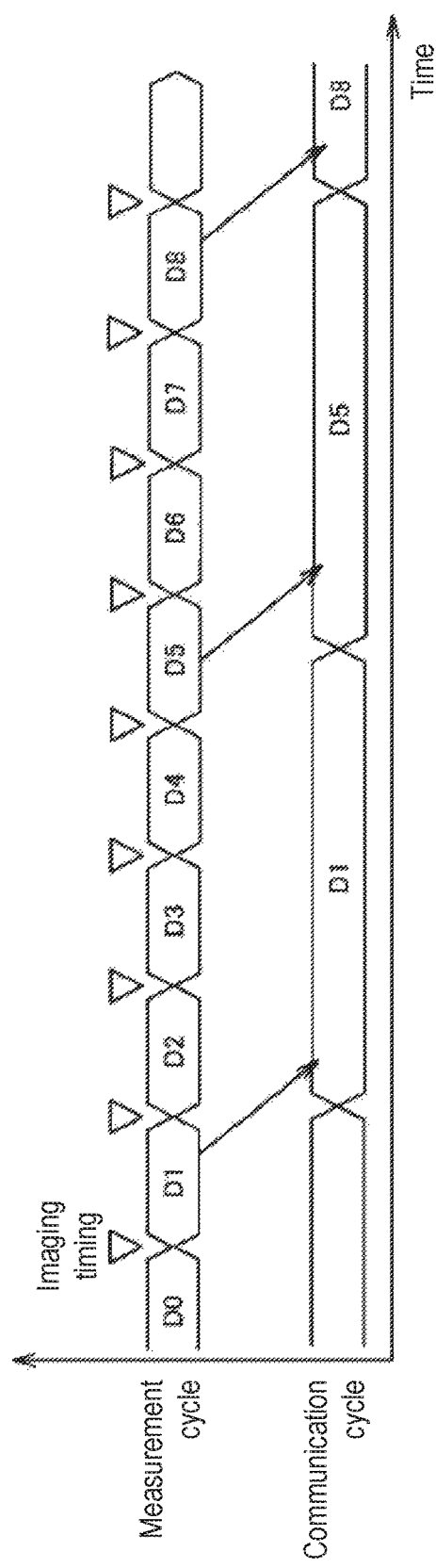
FIG. 4 is a timing chart explanatorily indicating a problem caused by asynchronization between a measurement cycle of an optical measurement apparatus connected to a fieldbus and a communication cycle of the EtherCAT.

C. Problem of asynchronization between measurement cycle and communication cycle FIG. 4 is a timing chart explanatorily indicating a problem caused by asynchronization between a measurement cycle of an optical measurement apparatus connected to a fieldbus and a communication cycle of the EtherCAT. With reference to FIG. 4, an optical measurement apparatus (e.g. an optical displacement sensor) typically executes imaging in accordance with the measurement cycle of the optical measurement apparatus itself. The optical measurement apparatus outputs a measured value in each communication cycle.

Figure 5:
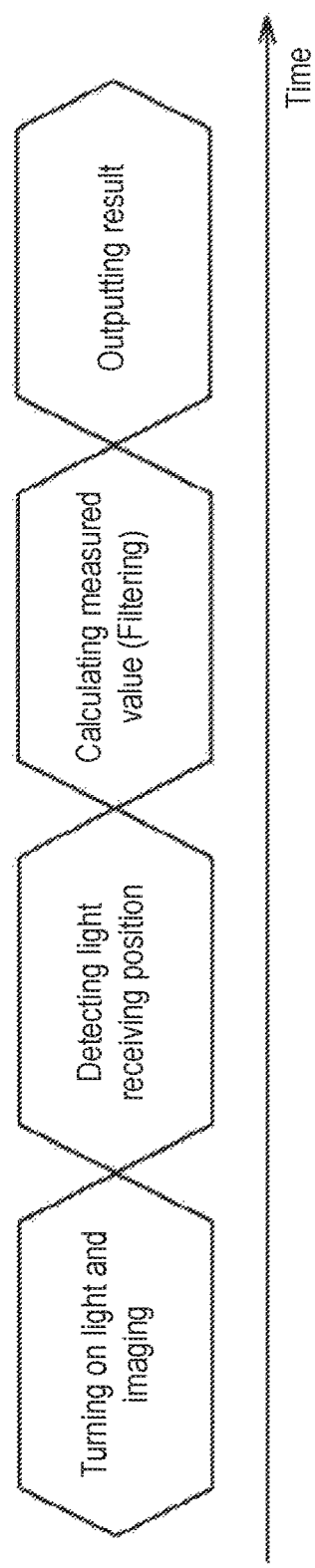
FIG. 5 is a timing chart explanatorily depicting a process flow of a typical optical displacement sensor.

FIG. 5 is a timing chart explanatorily depicting a process flow of a typical optical displacement sensor. With reference to FIG. 5, a light is turned on and imaging is executed initially. Subsequently executed is detection of a light receiving position. For example, the maximum light receiving intensity in an image pickup element is positionally specified for detection of the light receiving position (specified is a pixel of the image pickup element positionally corresponding to the maximum light receiving intensity). Subsequently executed is calculation of a measured value by means of filtering, calculation of an average value, or the like. The calculation of the measured value is followed by output of the measured value as a measurement result.

Figure 6:
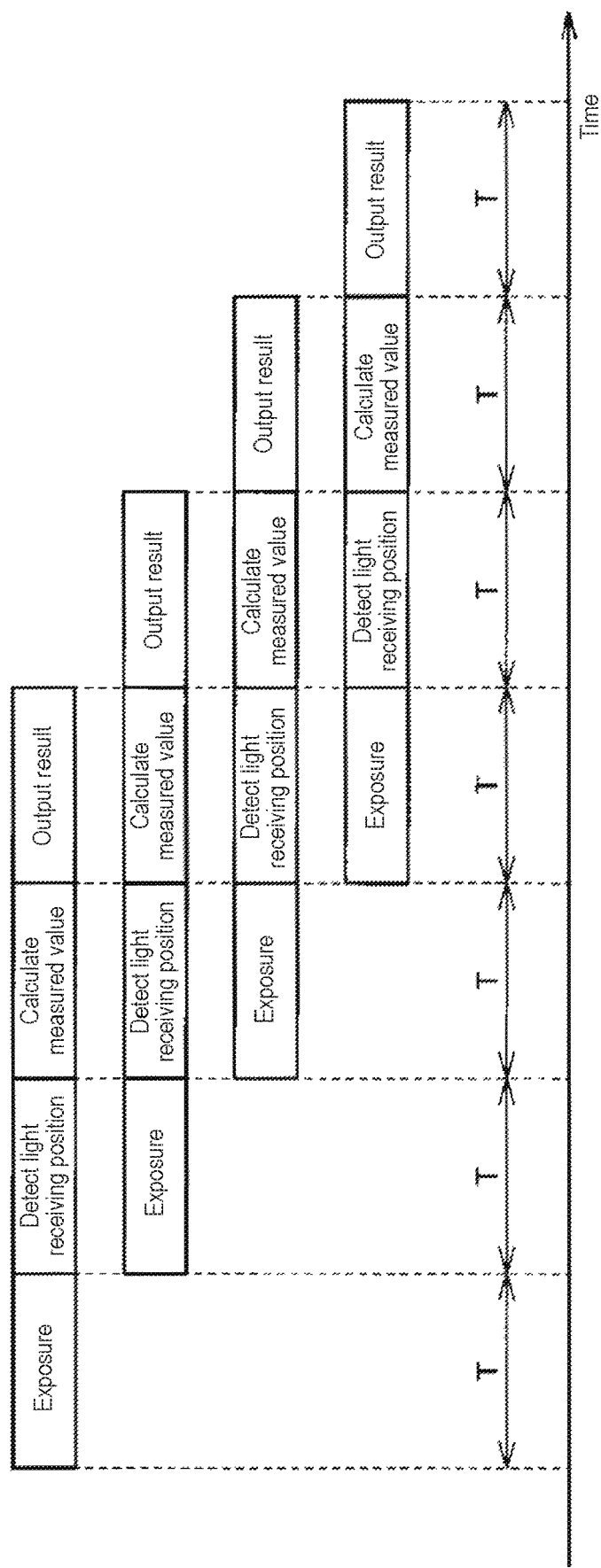
FIG. 6 is a chart of an exemplary process flow of the optical displacement sensor.

FIG. 6 is a chart of an exemplary process flow of the optical displacement sensor. With reference to FIG. 6, imaging is executed repetitively at a certain measurement cycle T. FIG. 6 exemplifies a case where a period (hereinafter called a "measurement period") needed from start of certain measurement (start of imaging) to result output of the measurement is obtained by calculation of the measurement cycle T+ a measurement processing period (3×T)=4×T.

With reference to FIG. 4 again, imaging timing is dependent on the measurement cycle. The imaging timing can, however, be different from timing of outputting the measured value (updating the measurement result). Any optical measurement apparatus such as the optical displacement sensor may have imaging timing different from timing of outputting a measured value (updating a measurement result). When the communication cycle of the fieldbus and the measurement cycle are not in synchronization with each other, the PLC 1 fails to determine timing of measurement for acquisition of the measured value transmitted from the optical measurement apparatus.

D. Synchronization between measurement cycle and communication cycle

The optical measurement apparatus according to the embodiment synchronizes measurement timing with the communication cycle of the fieldbus. The measurement timing is thus associated with the communication cycle of the fieldbus.

Figure 7:
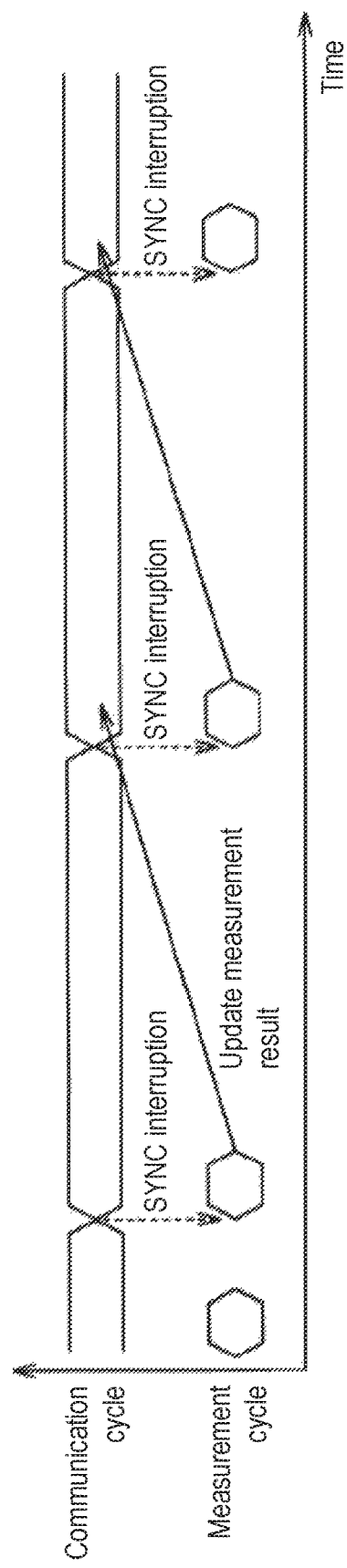
FIG. 7 is a schematic timing chart of exemplary synchronization between the measurement cycle of the optical measurement apparatus according to the embodiment of the present invention and the communication cycle.

FIG. 7 is a schematic timing chart of exemplary synchronization between the measurement cycle of the optical measurement apparatus 3 according to the embodiment and the communication cycle. As indicated in FIG. 7, the optical measurement apparatus 3 causes interruption for measurement in response to a received SYNC signal from the PLC 1. FIG. 7 and the subsequent figures indicate receipt of a SYNC signal as "SYNC interruption".

FIG. 7 exemplarily indicates a case where the measurement period (4×T) is shorter than the communication cycle. Synchronization of the measurement timing with the communication cycle of the fieldbus causes the measurement to end before the subsequent communication cycle starts. The optical measurement apparatus 3 can thus transmit the measurement result to the PLC 1 in accordance with a trigger of the start of the subsequent communication cycle.

In other words, the optical measurement apparatus 3 can output a result of measurement executed during a certain communication cycle, in the subsequent communication cycle.

Figure 8:
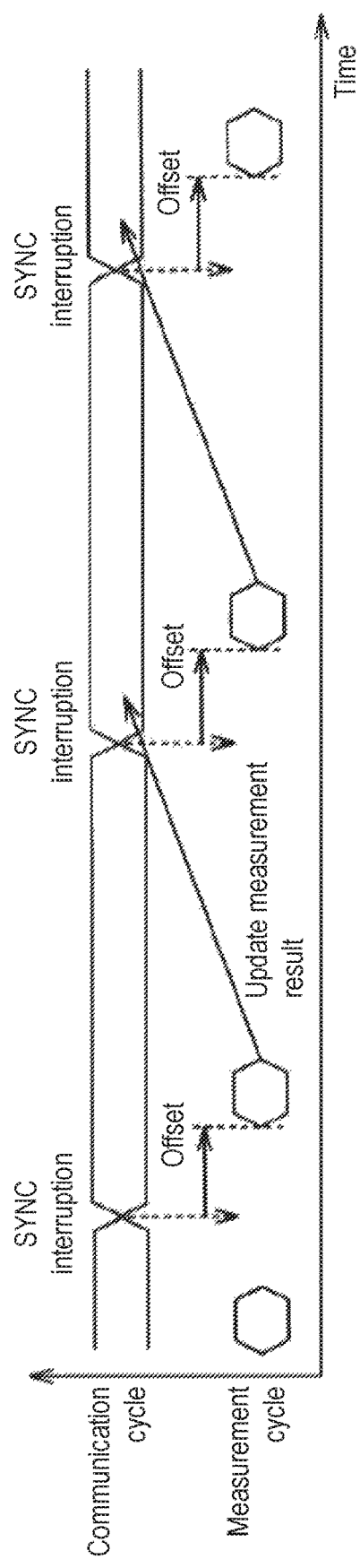
FIG. 8 is a schematic timing chart of different exemplary synchronization between the measurement cycle of the optical measurement apparatus according to the embodiment and the communication cycle.

FIG. 8 is a schematic timing chart of different exemplary synchronization between the measurement cycle of the optical measurement apparatus 3 according to the embodiment and the communication cycle. As indicated in FIG. 8, the optical measurement apparatus 3 may be configured to start measurement after elapse of an offset period from occurrence of SYNC interruption, in order to synchronize input timing of a different slave device with measurement start timing. The sum of the offset period and the measurement period is shorter than the communication cycle, so that the measurement ends before the subsequent communication cycle starts. The optical measurement apparatus 3 can output a result of measurement executed during a certain communication cycle, in the subsequent communication cycle.

FIGS. 7 and 8 exemplarily indicate the case where the measurement period (or the sum of offset period and the measurement period) is shorter than the communication cycle. The PLC 1 can thus find a communication cycle during which measurement is executed for acquisition of a result of the measurement, in accordance with receipt timing of the measurement result. The communication cycle is, however, dependent on circumstances of the measurement system 100. Meanwhile, the measurement cycle is determined by factors such as reflectance of the measurement target 51, specifications of the optical measurement apparatus 3, and individual specificity of the optical measurement apparatus 3, and thus has a length irrelevant to the communication cycle. The measurement system 100 is not necessarily built up so as to have a measurement period shorter than the communication cycle.

For example, an exposure period can be long dependently on the reflectance of the measurement target 51. In such a case, the measurement period can be equal to or longer than the communication cycle.

Figure 9:
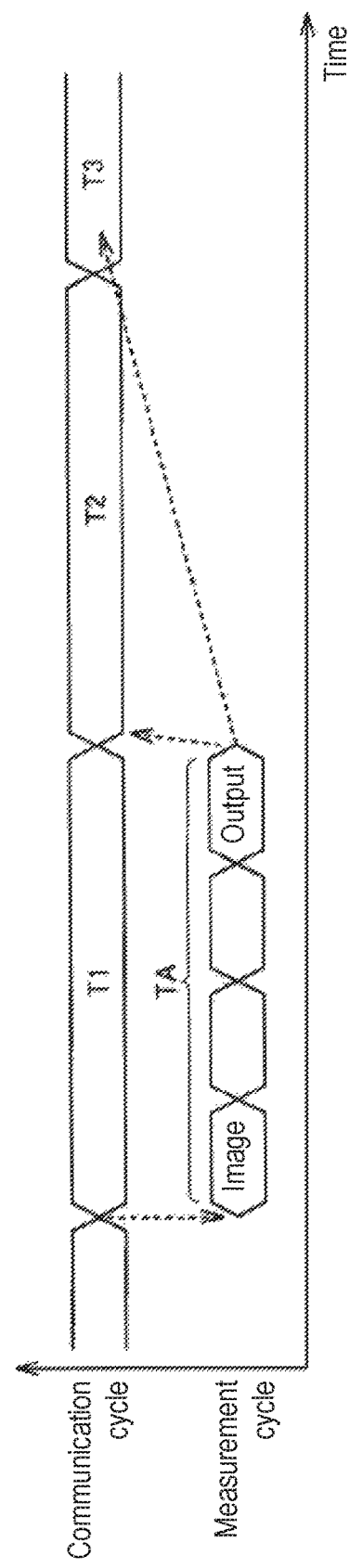
FIG. 9 is a schematic timing chart exemplifying a case where a measurement period of the optical measurement apparatus according to the embodiment is substantially equal in length to the communication cycle.

FIG. 9 is a schematic timing chart exemplifying a case where the measurement period of the optical measurement apparatus 3 according to the embodiment is substantially equal in length to the communication cycle. As indicated in FIG. 9, measurement starts in synchronization with start of a communication cycle T1. A measurement period TA is substantially equal in length to communication cycles T1 to T3. Timing of updating the measurement result can thus be included in the communication cycle T2 subsequent to the communication cycle T1, or in the communication cycle T3 subsequent to the communication cycle T2.

In a case where the timing of updating the measurement result is dependent on the circumstances of the measurement system 100, the timing of updating the measurement result may be calculated by a user in accordance with description of a user's manual or the like. The user will, however, have more difficulty in building up the measurement system in such a case. It is also difficult to check correctness of the calculated update timing. Even if the calculated update timing is correct, the timing of updating the measurement result can deviate from the calculated timing due to the individual specificity of the optical measurement apparatus 3 or the like. It is difficult to detect such timing deviation.

The optical measurement apparatus 3 according to the embodiment of the present invention is configured to output a synchronization supervisory signal. The synchronization supervisory signal changes between a first state and a second state in synchronization with the communication cycle.

Change into the first state indicates start of measurement, whereas change into the second state indicates result output of the measurement (i.e. end of the measurement). The PLC 1 monitors the synchronization supervisory signal to detect start and end of the measurement cycle of the optical measurement apparatus 3. This configuration achieves establishment of a stable measurement system. The optical measurement apparatus 3 according to the embodiment of the present invention will now be described in more detail below.

E. Configuration of optical measurement apparatus

Figure 10:
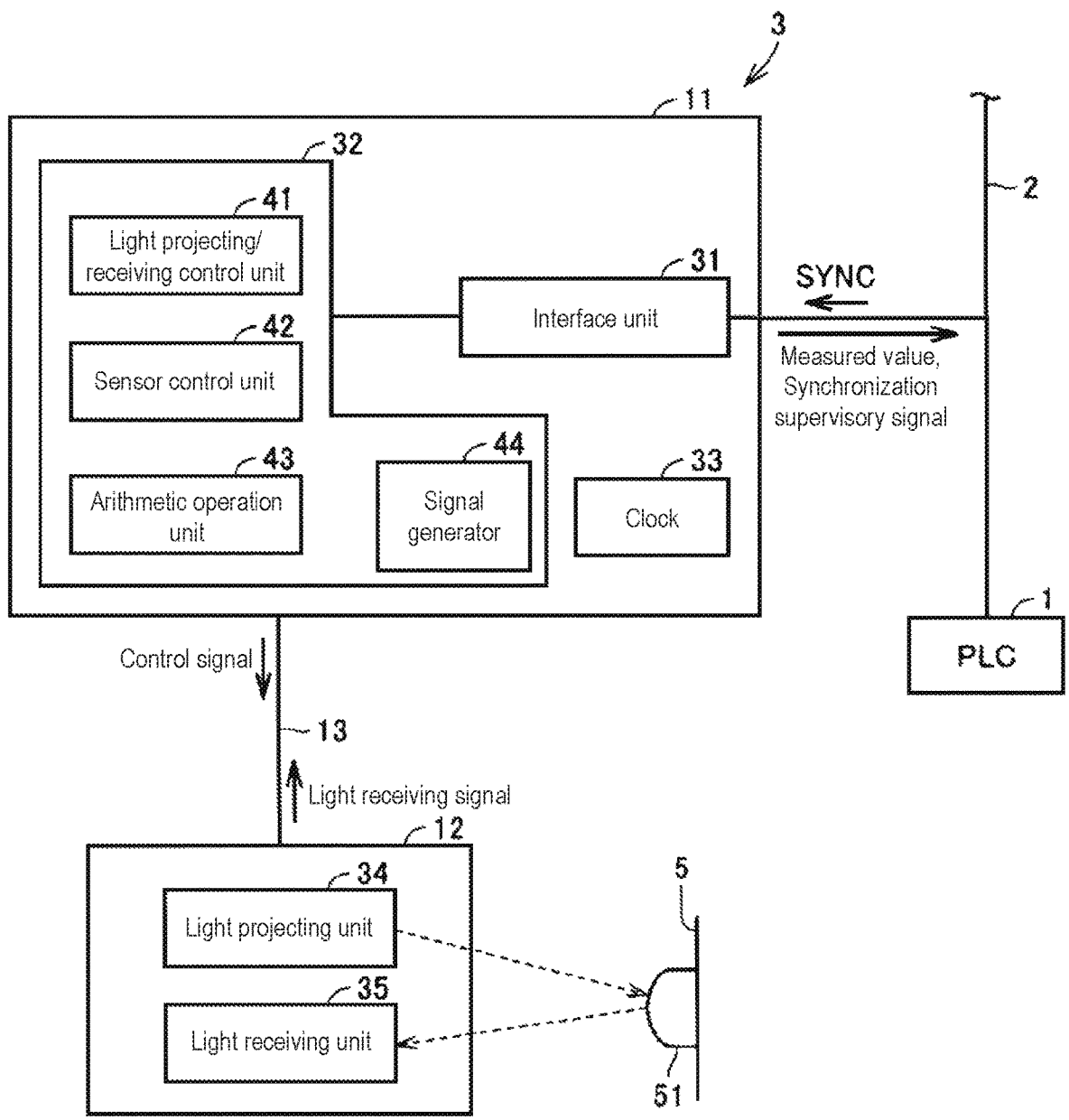
FIG. 10 is a block diagram of a detailed configuration of the optical measurement apparatus according to the embodiment.

FIG. 10 is a block diagram of a detailed configuration of the optical measurement apparatus according to the embodiment. With reference to FIG. 10, the sensor controller 11 includes an interface unit 31, a measuring unit 32, and a clock 33. The measuring unit 32 includes a light projecting/receiving control unit 41, a sensor control unit 42, an arithmetic operation unit 43, and a signal generator 44.

The interface unit 31 is configured to execute input to and output from the fieldbus 2. The interface unit 31 receives a SYNC signal from the PLC 1 through the frame 21 (see FIG. 2) transmitted in the fieldbus 2. The SYNC signal is generated in each communication cycle. The interface unit 31 transmits a measured value and a synchronization supervisory signal to the PLC 1 via the fieldbus 2.

The measuring unit 32 integrally controls the optical measurement apparatus 3 to optically measure displacement of the measurement target 51 in accordance with the measurement cycle. The measuring unit 32 further generates a synchronization supervisory signal indicating start and end of the measurement.

The light projecting/receiving control unit 41 issues a control signal for measurement start in response to a SYNC signal. The sensor control unit 42 and the arithmetic operation unit 43 each execute a measurement process in response to the control signal. The arithmetic operation unit 43 generates a measured value indicating a result of displacement measured by the optical measurement apparatus 3. The signal generator 44 generates a synchronization supervisory signal.

The clock 33 generates a clock signal for determination of timing and the like of a process executed by the optical measurement apparatus 3. The measurement cycle is determined in accordance with the clock signal. The clock signal is not necessarily generated inside the sensor controller 11. The clock signal can alternatively be supplied from outside the sensor controller 11.

The sensor head 12 receives the control signal from the sensor control unit 42 via the cable 13. The sensor head 12 includes a light projecting unit 34 and a light receiving unit 35.

The light projecting unit 34 projects light toward the stage 5 in response to the control signal. The light receiving unit 35 receives light reflected at the stage 5 or the measurement target 51. The light receiving unit 35 optionally includes an image pickup element (not depicted). The light receiving unit 35 outputs a light receiving signal indicating an amount of light received by the light receiving unit 35 in response to the control signal. The light receiving signal is transmitted to the measuring unit 32 via the cable 13. The arithmetic operation unit 43 calculates a measured value in accordance with the amount of received light indicated by the light receiving signal.

In a case where the optical measurement apparatus 3 is embodied as an optical displacement sensor, there is no particular limitation to a displacement measuring method. Examples of the displacement measuring method include the white confocal method and the triangulation method.

F. Output from optical measurement apparatus

Figure 11:
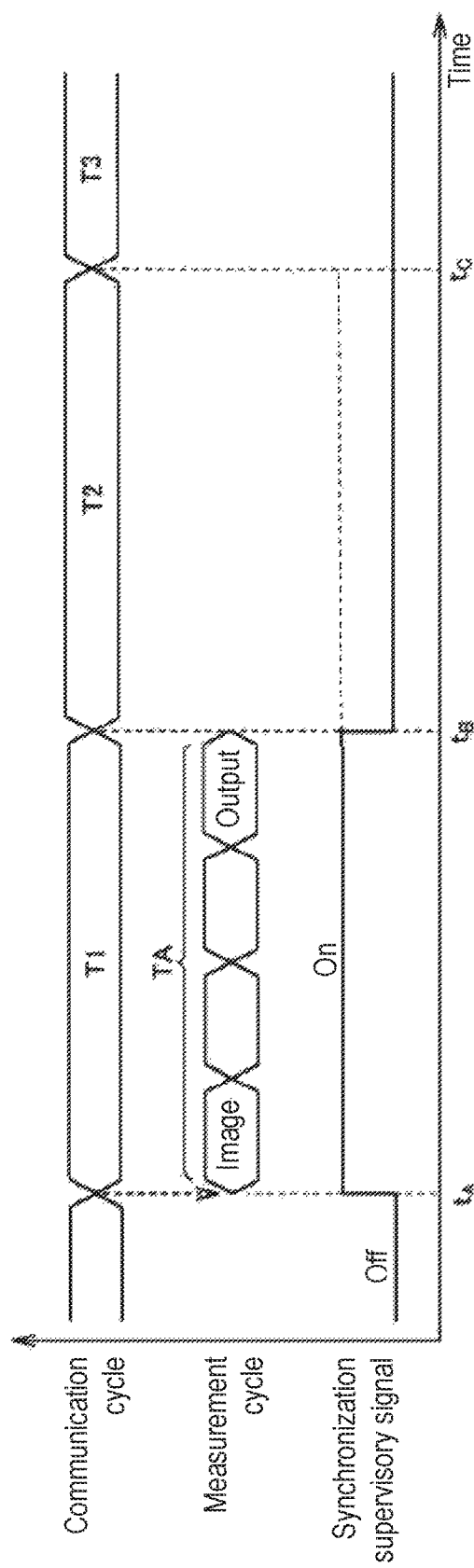
FIG. 11 is a schematic timing chart indicating exemplary output of a synchronization supervisory signal by the optical measurement apparatus according to the embodiment.

FIG. 11 is a schematic timing chart indicating exemplary output of a synchronization supervisory signal by the optical measurement apparatus 3 according to the embodiment. With reference to FIGS. 10 and 11, at time $t_A$, the optical measurement apparatus 3 starts measurement in synchronization with the communication cycle and changes the synchronization supervisory signal from an OFF state into an ON state. The synchronization supervisory signal is thus set into the ON state as the first state at the time $t_A$.

The optical measurement apparatus 3 changes the synchronization supervisory signal from the ON state into the OFF state at timing of outputting a result of the measurement. In a case where the optical measurement apparatus 3 outputs the measurement result in synchronization with start of the communication cycle T2, the optical measurement apparatus 3 changes the synchronization supervisory signal from the ON state into the OFF state at start time $t_B$ of the communication cycle T2. The synchronization supervisory signal is thus set into the OFF state as the second state at the time $t_B$. In a case where the optical measurement apparatus 3 outputs the measurement result in synchronization with start of the communication cycle T3, the optical measurement apparatus 3 may change the synchronization supervisory signal from the ON state into the OFF state at start time $t_C$ of the communication cycle T3.

Detecting timing of change in state of the synchronization supervisory signal from the OFF state into the ON state enables detection of measurement start by the optical measurement apparatus 3. The synchronization supervisory signal in the ON state indicates that the optical measurement apparatus 3 is executing measurement, in other words, is executing a process for result output of the measurement. Detecting timing of change in state of the synchronization supervisory signal from the ON state into the OFF state enables detection of output of a measurement result from the optical measurement apparatus 3.

The PLC 1 monitors the state of the synchronization supervisory signal to detect start timing of measurement by the optical measurement apparatus 3 and result output timing of the measurement. The PLC 1 can thus associate result output timing of measurement with start timing of the measurement.

The synchronization supervisory signal according to the embodiment has the first state corresponding to the ON state and the second state corresponding to the OFF state. However, the synchronization supervisory signal is not limited to this case. The synchronization supervisory signal can alternatively have the first state corresponding to the OFF state and the second state corresponding to the ON state.

Figure 12:
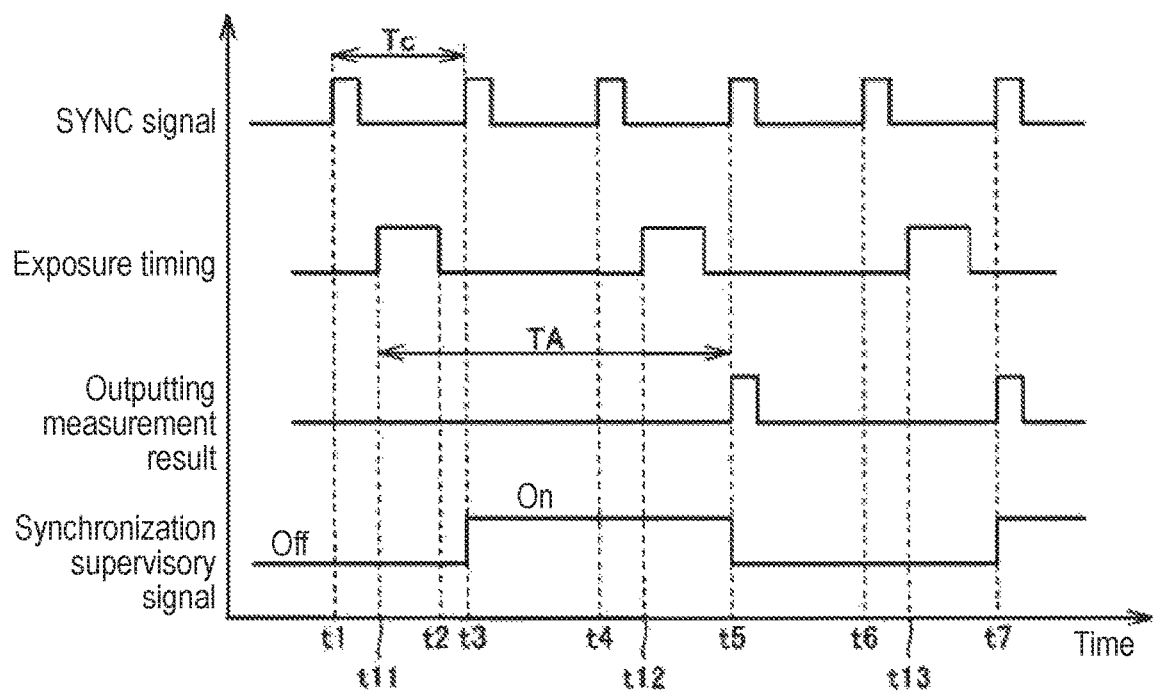
FIG. 12 is a timing chart explanatorily depicting measurement in synchronization with the communication cycle, executed by the optical measurement apparatus according to the embodiment of the present invention.

FIG. 12 is a timing chart explanatorily depicting measurement in synchronization with the communication cycle, executed by the optical measurement apparatus according to the embodiment of the present invention. With reference to FIG. 12, the PLC 1 outputs a SYNC signal at a constant communication cycle Tc. The interface unit 31 (see FIG. 10) of the optical measurement apparatus 3 thus receives a SYNC signal in each of the communication cycles Tc.

The optical measurement apparatus 3 receives a SYNC signal at time t1. The optical measurement apparatus 3 starts exposure and imaging at time t11 in response to the received SYNC signal. A length from the time t1 to the time t11 can be dependent on the circumstances of the measurement system 100.

The optical measurement apparatus 3 ends the exposure and the imaging at time t2. The optical measurement apparatus 3 thereafter executes a process for output of a measurement result. For example, the time t1 and the time t2 have a constant length therebetween. Change in length from the time t1 to the time t11 thus causes change in exposure period.

The optical measurement apparatus 3 receives a subsequent SYNC signal at time t3. The optical measurement apparatus 3 is executing measurement at the time t3. The optical measurement apparatus 3 causes change in state of the synchronization supervisory signal from the OFF state into the ON state in synchronization with receipt of the SYNC signal.

At time t4 just after the optical measurement apparatus 3 completes measurement, the optical measurement apparatus 3 receives a SYNC signal. The optical measurement apparatus 3 starts measurement in synchronization with receipt of the SYNC signal. At the time t4, a result of the measurement started at the time t11 has not been outputted yet. Measurement thus starts between the time t4 and time t5 whereas the synchronization supervisory signal is kept in the ON state. Upon receipt of the SYNC signal at the time t4, the optical measurement apparatus 3 starts exposure and imaging at time t12.

The optical measurement apparatus 3 receives a SYNC signal at the time t5. In synchronization with receipt of the SYNC signal, the optical measurement apparatus 3 outputs the result of the measurement started at the time t11 and causes change in state of the synchronization supervisory signal from the ON state into the OFF state. The measurement started at the time t11 ends at the time t5. The time t11 and the time t5 have the measurement period TA therebetween. The communication cycle Tc is shorter than the measurement cycle.

Just before time t6, the optical measurement apparatus 3 completes the measurement started at the time t12. Upon receipt of a SYNC signal at the time t6, the optical measurement apparatus 3 starts exposure and imaging at time t13.

The optical measurement apparatus 3 receives a SYNC signal at time t7. The optical measurement apparatus 3 outputs a result of the measurement started at the time t12 in response to the received SYNC signal. The optical measurement apparatus 3 further causes change in state of the synchronization supervisory signal from the ON state into the OFF state. The change in state of the synchronization supervisory signal indicates start of the measurement at the time t13.

As indicated by the change in state of the synchronization supervisory signal from the time t3 and the time t5, when the optical measurement apparatus 3 once brings the synchronization supervisory signal into the ON state at start of measurement, the optical measurement apparatus 3 keeps the synchronization supervisory signal in the ON state until result output of the measurement. For example, while the measurement started at the time t11 is being executed, the subsequent measurement starts at the time t12. The synchronization supervisory signal is in the ON state at the time t12. In other words, the state of the synchronization supervisory signal is not influenced by later measurement start. The optical measurement apparatus 3 brings the synchronization supervisory signal into the OFF state at timing of outputting a measurement result. The result output timing of measurement can then be associated with the start timing of the measurement. The PLC 1 can thus precisely find measurement start timing corresponding to a measured value.

At the time t5, the synchronization supervisory signal turns into the OFF state to indicate result output, from the optical measurement apparatus 3, of the measurement started at the time t11, and it is also indicated that the different measurement has started at the time t12. The synchronization supervisory signal is in the ON state at and before the time t5. The measuring unit 32 thus brings the synchronization supervisory signal into the OFF state at the time t5. The measurement result (a measured value) outputted from the optical measurement apparatus 3 at the time t5 can thus be associated with start timing of measurement for acquisition of the measured value.

At the time t7, the synchronization supervisory signal turns into the ON state to indicate result output of the measurement started at the time t13, and it is also indicated that the optical measurement apparatus 3 outputs the result of the measurement started at the time t12. The synchronization supervisory signal is in the OFF state at and before the time t7. The measuring unit 32 thus brings the synchronization supervisory signal into the ON state at the time t7. The synchronization supervisory signal thus indicates that measurement has started in a communication cycle just before the time t7. Because the synchronization supervisory signal is in the OFF state at and before the time t7, the synchronization supervisory signal is not changed in state to indicate that measurement has started at the time t12. Result output timing of measurement is thus reliably associated with start timing of the measurement.

G. Output flow of synchronization supervisory signal

Figure 13:
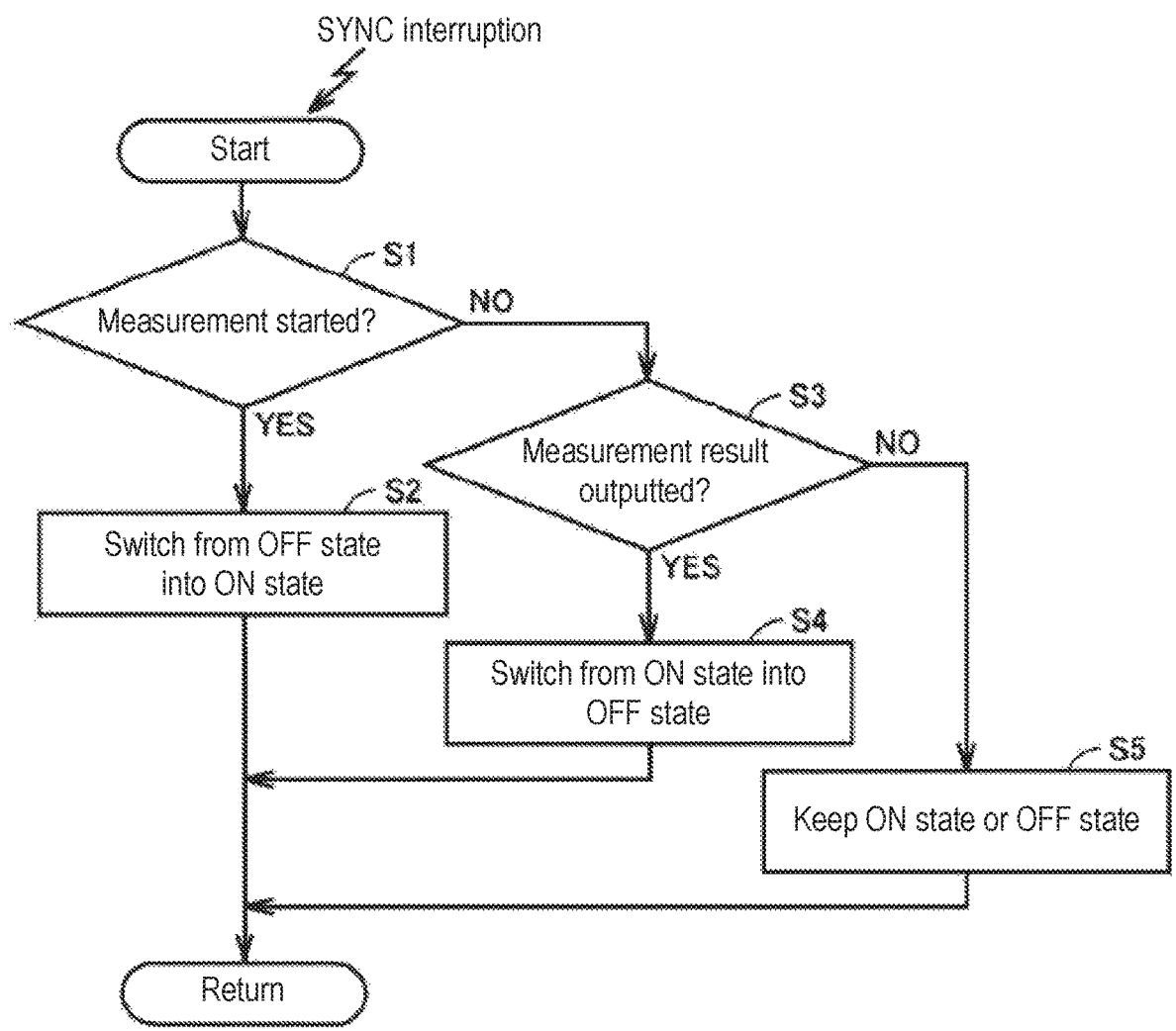
FIG. 13 is a flowchart of a series of processes related to output of a synchronization supervisory signal, executed by the optical measurement apparatus according to the embodiment.

FIG. 13 is a flowchart of a series of processes related to output of a synchronization supervisory signal, executed by the optical measurement apparatus 3 according to the embodiment. With reference to FIGS. 10 and 13, a process starts upon occurrence of SYNC interruption, and the series of processes depicted in FIG. 13 are executed repetitively every time SYNC interruption occurs.

In step S1, the optical measurement apparatus 3 (e.g. the measuring unit 32) determines whether or not measurement has already started at occurrence of SYNC interruption. It is determined that the measurement has already started in an exemplary case where exposure and imaging have been completed. The flow proceeds to step S2 in this case (YES in step S1).

In step S2, the optical measurement apparatus 3 (e.g. the signal generator 44) causes change in state of the synchronization supervisory signal from the OFF state into the ON state. Specifically, the optical measurement apparatus 3 causes change in state of the synchronization supervisory signal to indicate measurement start in response to the SYNC interruption.

In another case where SYNC interruption timing does not match timing indicative of measurement start (NO in step S1), the flow proceeds to step S3. In this case, the optical measurement apparatus 3 (e.g. the measuring unit 32) determines whether or not the SYNC interruption timing matches measurement result output timing. In a case where the SYNC interruption timing matches the measurement result output timing (YES in step S3), the optical measurement apparatus 3 (e.g. the signal generator 44) causes change in state of the synchronization supervisory signal from the ON state into the OFF state. Specifically, the optical measurement apparatus 3 causes change in state of the synchronization supervisory signal to indicate measurement result output in response to the SYNC interruption.

In another case where the SYNC interruption timing does not match the timing indicative of measurement start or the measurement result output timing (NO in step S3), the flow proceeds to step S5. In this case, the optical measurement apparatus 3 (e.g. the signal generator 44) keeps the synchronization supervisory signal in the ON state or in the OFF state. In other words, the synchronization supervisory signal is not changed in state. After the process in step S2, S4, or S5 is executed, this flow returns into a standby state for start in response to SYNC interruption.

H. Exemplary application

Figure 14:
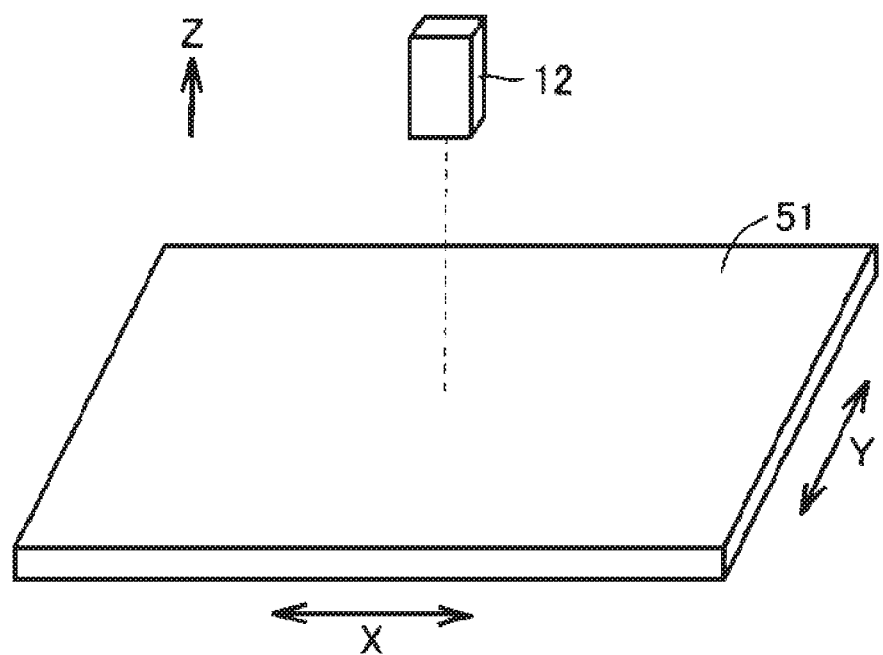
FIG. 14 is an outline diagram depicting exemplary application of the measurement system of FIG. 1.

FIG. 14 is an outline diagram depicting exemplary application of the measurement system 100 of FIG. 1. With reference to FIGS. 1 and 14, the measurement target 51 is scanned two dimensionally (in the X and Y directions) by the servo motor 4 configured to drive the stage 5 (see FIG. 1). The sensor head 12 measures a distance (displacement in a Z direction) from the sensor head 12 to the measurement target 51. Position data and a measured value of the optical measurement apparatus 3 are transmitted to the PLC 1 that links the position data with the measured value of the optical measurement apparatus 3 by a program executed inside the PLC 1. The configuration depicted in FIGS. 1 and 14 enables measurement of displacement unlikely to be influenced by acceleration and deceleration of the stage 5. There is thus established a three-dimensional shape measurement system achieving precise measurement.

The program executed inside the PLC 1 needs consideration of deviation between timing of receiving the measured value of the optical measurement apparatus 3 by the PLC 1 and timing of receiving the position data from the servo motor 4 by the PLC 1, upon linking the measured value of the optical measurement apparatus 3 with the position data. The stage 5 does not necessarily shift at constant speed. The shape of the measurement target 51 is thus measured less precisely as there is larger time deviation.

Figure 15:
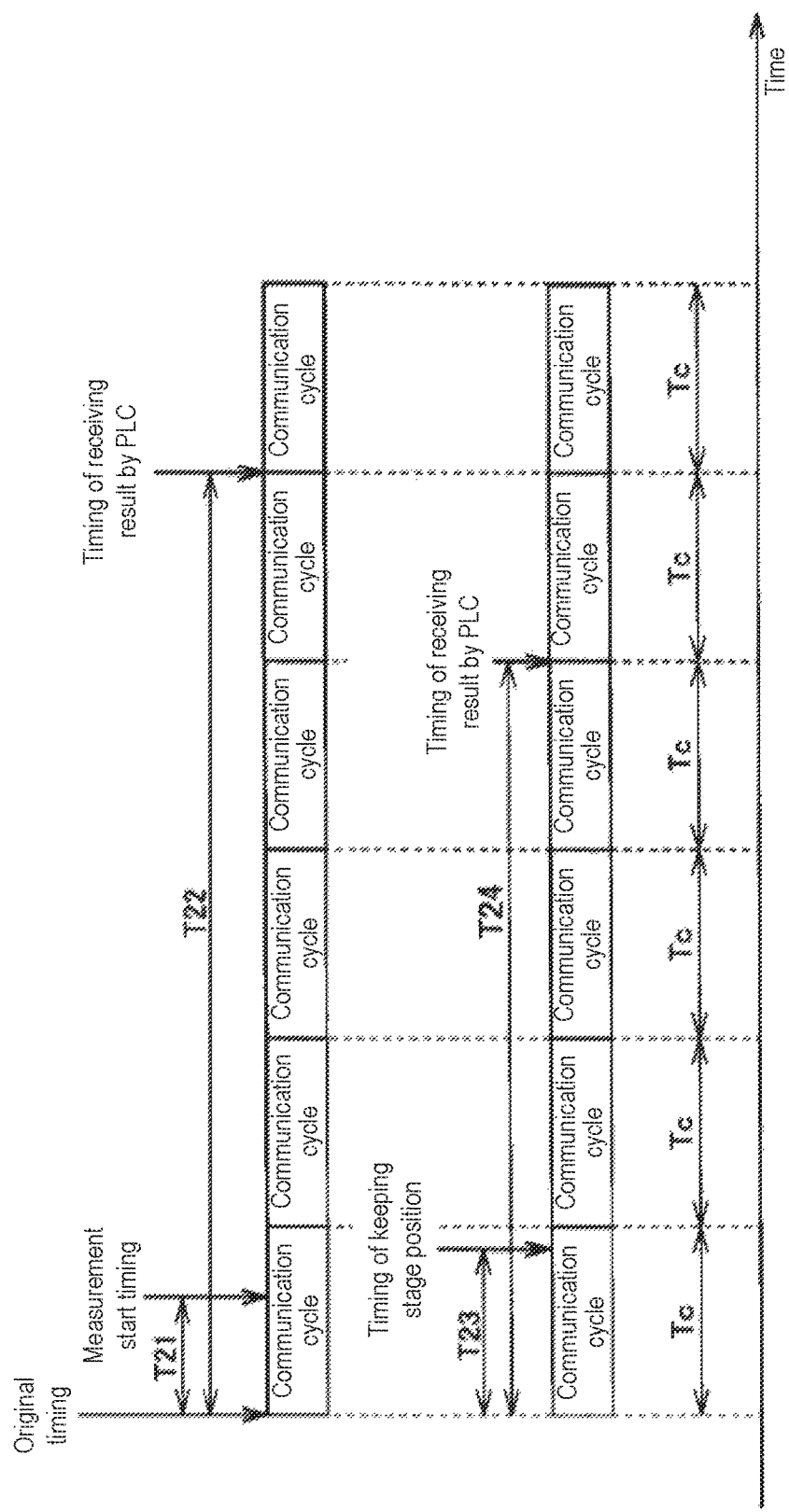
FIG. 15 is a timing chart explanatorily indicating time deviation to be handled by a PLC when the PLC links a measured value of the optical measurement apparatus with position data from a servo motor.

FIG. 15 is a timing chart explanatorily indicating time deviation to be handled by the PLC 1 when the PLC 1 links the measured value of the optical measurement apparatus 3 with the position data from the servo motor 4. FIG. 15 indicates four types of timing deviation. First deviation T21 occurs between original timing and timing of measurement start by the optical measurement apparatus 3. Second deviation T22 occurs between the original timing and timing of receiving a measurement result by the PLC 1. Third deviation T23 occurs between the original timing and timing of keeping the position of the stage 5 by the servo motor 4. Fourth deviation T24 occurs between the original timing and timing of receiving position data by the PLC 1.

The second deviation T22 and the fourth deviation T24 occur by a unit of the communication cycle Tc (to have a length obtained by integral multiplication of the communication cycle). More specifically, the second deviation T22 varies by the unit of the communication cycle Tc in accordance with combination of the communication cycle Tc and the measurement period TA (see FIG. 12). Furthermore, the second deviation T22 can vary by the unit of the communication cycle Tc also in accordance with the individual specificity of the optical measurement apparatus 3. The PLC 1 measures a period of the synchronization supervisory signal in the ON state (e.g. the period from the time t3 to the time t5 indicated in FIG. 12) to find a length of the second deviation T22.

If there is established a condition that the second deviation T22 does not vary during operation of the optical measurement apparatus 3, the PLC 1 has to find the length of the second deviation T22 only once at operation start of the optical measurement apparatus 3. The PLC 1 can correct the deviation amount in accordance with the length. In another case where the second deviation T22 possibly varies during operation of the optical measurement apparatus 3, the PLC 1 constantly measures the period of the synchronization supervisory signal in the ON state, to correct the deviation amount in accordance with the measured period.

The fourth deviation T24 can be regarded as being substantially constant in length. Reasons therefor include that positionally holding the stage 5 needs a sufficiently short process period and that the process period has slight variation. The PLC 1 can thus correct position data with reference to a preliminarily fixed deviation amount (e.g. fixed in accordance with specifications).

Figure 16:
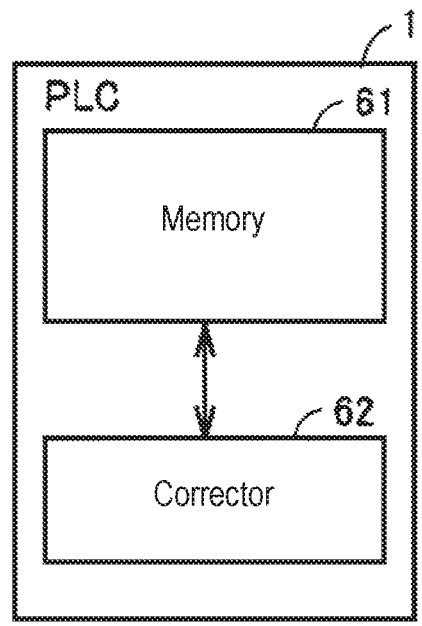
FIG. 16 is a functional block diagram depicting a schematic configuration of the PLC for correction of a deviation amount.

FIG. 16 is a functional block diagram depicting a schematic configuration of the PLC 1 for correction of a deviation amount. With reference to FIG. 16, the PLC 1 includes a memory 61 and a corrector 62. The memory 61 configures a memory space storing a measured value transmitted from the optical measurement apparatus 3 and position data transmitted from the servo motor 4. The corrector 62 executes a process for correction of the deviation amount with reference to the measured value and the position data stored in the memory 61. The measured value from the optical measurement apparatus 3 can thus be precisely linked with the position data, for acquisition of a precise measured value on the shape of the measurement target 51.

Figure 17A:
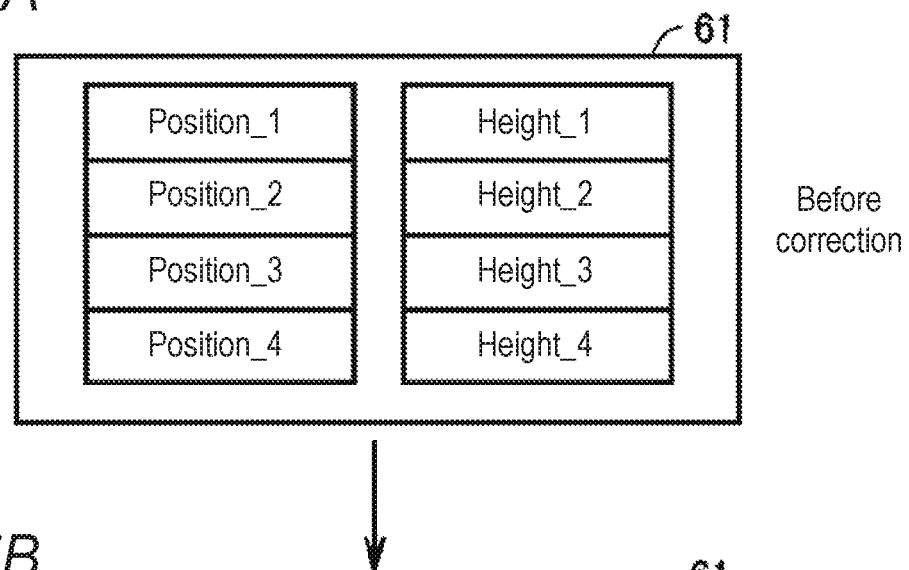
FIGS. 17A and 17B are schematic charts depicting position data and measured values (height data) of the optical measurement apparatus, which are held in a memory space before and after correction.
Figure 17B:
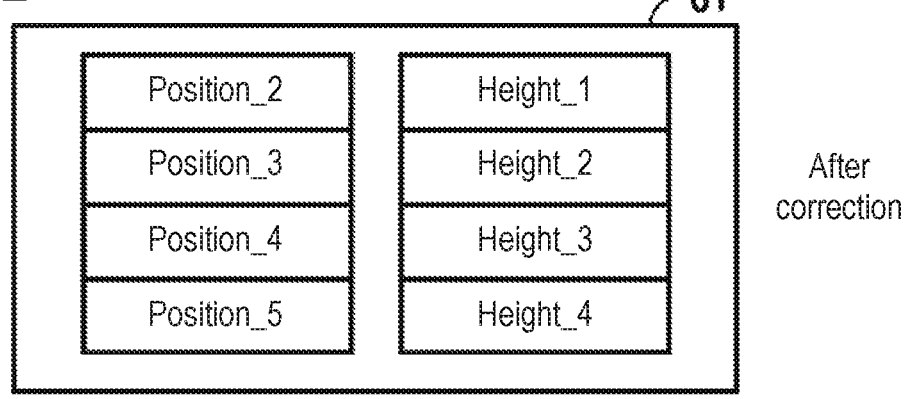

FIGS. 17A and 17B are schematic charts depicting position data and measured values (height data) of the optical measurement apparatus 3, which are held in the memory space before and after correction. As depicted in FIGS. 17A and 17B, the position data and the height data are linked with each other before correction or the like, as indicated by (position_1, height_1), (position_2, height_2), (position_3, height_3), and (position_4, height_4). When the deviation amount is corrected, the position data and the height data are linked with each other, as indicated by (position_2, height_1), (position_3, height_2), (position_4, height_3), and (position_5, height_4).

In a case where the first deviation T21 is definite in the timing chart of FIG. 15, the amount of deviation from the communication cycle can be matched by matching the third deviation T23 to the first deviation T21. In another case where the third deviation T23 is definite, the first deviation T21 may be matched to the third deviation T23. This case also achieves matching the amount of deviation from the communication cycle.

In the measurement system 100 according to the embodiment, the PLC 1 executes the program including the above correction processes. During the execution, the PLC 1 monitors the timing of change in state of the synchronization supervisory signal into the ON state and into the OFF state, as well as the period of the synchronization supervisory signal in the ON state. This enables detection of any unintended correction deviation, to achieve correction of the correction deviation. The shape of the measurement target 51 can thus be measured precisely.

In the optical measurement apparatus 3 according to the embodiment of the present invention, the measuring unit 32 can alternatively be configured to generate a plurality of synchronization supervisory signals respectively corresponding to a plurality of measurement processes. In this case, the measuring unit 32 can set, into the ON state, a first synchronization supervisory signal corresponding to first measurement in the plurality of measurement processes, out of the plurality of synchronization supervisory signals, in accordance with start of the first measurement. The measuring unit 32 can further start second measurement subsequent to the first measurement, and set, into the ON state, a second synchronization supervisory signal corresponding to the second measurement, out of the plurality of synchronization supervisory signals, before setting the first synchronization supervisory signal into the OFF state. Also in this case, the master device can precisely find start timing of each of the measurement processes by the optical measurement apparatus 3 in accordance with the synchronization supervisory signals.

The timing chart of FIG. 12 exemplifies the case where the communication cycle is longer than the measurement cycle and is shorter than the period (measurement period) obtained by adding the processing period of measurement by the measuring unit to the measurement cycle. Also in a case where the communication cycle is shorter than the measurement cycle, the optical measurement apparatus 3 according to the embodiment of the present invention is configured to associate the timing of outputting a measurement result with the timing of starting measurement for acquisition of the measurement result.

The measurement system 100 can optionally include a plurality of optical measurement apparatuses 3 according to the embodiment of the present invention. In this case, the plurality of optical measurement apparatuses 3 optionally have exposure end timing in synchronization with one another. The synchronization supervisory signal can be changed from the OFF state into the ON state at the timing (corresponding to the time t7 in FIG. 12) matching timing of receiving a subsequent SYNC signal by each of the optical measurement apparatuses 3 having received a SYNC signal and having started measurement.

The embodiment disclosed herein should be regarded as exemplary and not limitative in every aspect. The scope of the present invention is disclosed not in the above description but in the following claims, and is intended to include meanings equivalent to those of the claims and all modifications made within the scope.

The invention claimed is:

1. An optical measurement apparatus having a synchronizing function of synchronizing time between a master device and a slave device, and connectable to an industrial network, the optical measurement apparatus comprising:
    an interface unit configured to receive a synchronization signal transmitted from the master device to the industrial network at a constant communication cycle, and output, in synchronization with the synchronization signal, a result of measurement by the optical measurement apparatus and a synchronization supervisory signal having a first state and a second state; and
    a measuring unit configured to execute at least one optical measurement process at a measurement cycle different from the communication cycle and generate the measurement result and the synchronization supervisory signal,
    wherein
    the measuring unit is configured to switch the synchronization supervisory signal from the second state to the first state in synchronization with receipt of the synchronization signal by the interface unit after start of the measurement, and is configured to switch the synchronization supervisory signal from the first state to the second state in synchronization with receipt of the synchronization signal by the interface unit when the interface unit outputs the measurement result.

2. The optical measurement apparatus according to claim 1, wherein the measuring unit is configured to switch the synchronization supervisory signal from the second state to the first state in synchronization with timing of receipt of the synchronization signal by the interface unit.

3. The optical measurement apparatus according to claim 2, wherein the measuring unit is configured to switch the synchronization supervisory signal from the first state to the second state at timing of outputting the measurement result by the interface unit in synchronization with the synchronization signal.

4. The optical measurement apparatus according to claim 1, wherein the measuring unit is configured to execute in a parallel manner a plurality of measurement processes different from each other in start timing, and the measuring unit is configured to set the synchronization supervisory signal to the first state or the second state to cause change in state of the synchronization supervisory signal when the plurality of measurement processes cause timing of setting the synchronization supervisory signal to the first state matching timing of setting the synchronization supervisory signal to the second state.

5. The optical measurement apparatus according to claim 1, wherein the measuring unit is configured to execute in a parallel manner a plurality of measurement processes different from each other in start timing, and generate the synchronization supervisory signal corresponding to each of the plurality of measurement processes, and the measuring unit is configured to set a first synchronization supervisory signal corresponding to a first measurement process in the plurality of measurement processes, out of the plurality of synchronization supervisory signals, to the first state in accordance with start of the first measurement process, starts a second measurement process subsequent to the first measurement process before setting the first synchronization supervisory signal to the second state, and sets a second synchronization supervisory signal corresponding to the second measurement process, out of the plurality of synchronization supervisory signals, to the first state.

6. The optical measurement apparatus according to claim 1, wherein the communication cycle is shorter than the measurement cycle, or is longer than the measurement cycle and shorter than a period obtained by adding a processing period of measurement by the measuring unit to the measurement cycle.

* * * * *